Nov. 20, 1951   W. C. MORRIS   2,575,925
DUAL POTENTIAL UNBALANCE RESPONSIVE DEVICE
Filed June 9, 1950
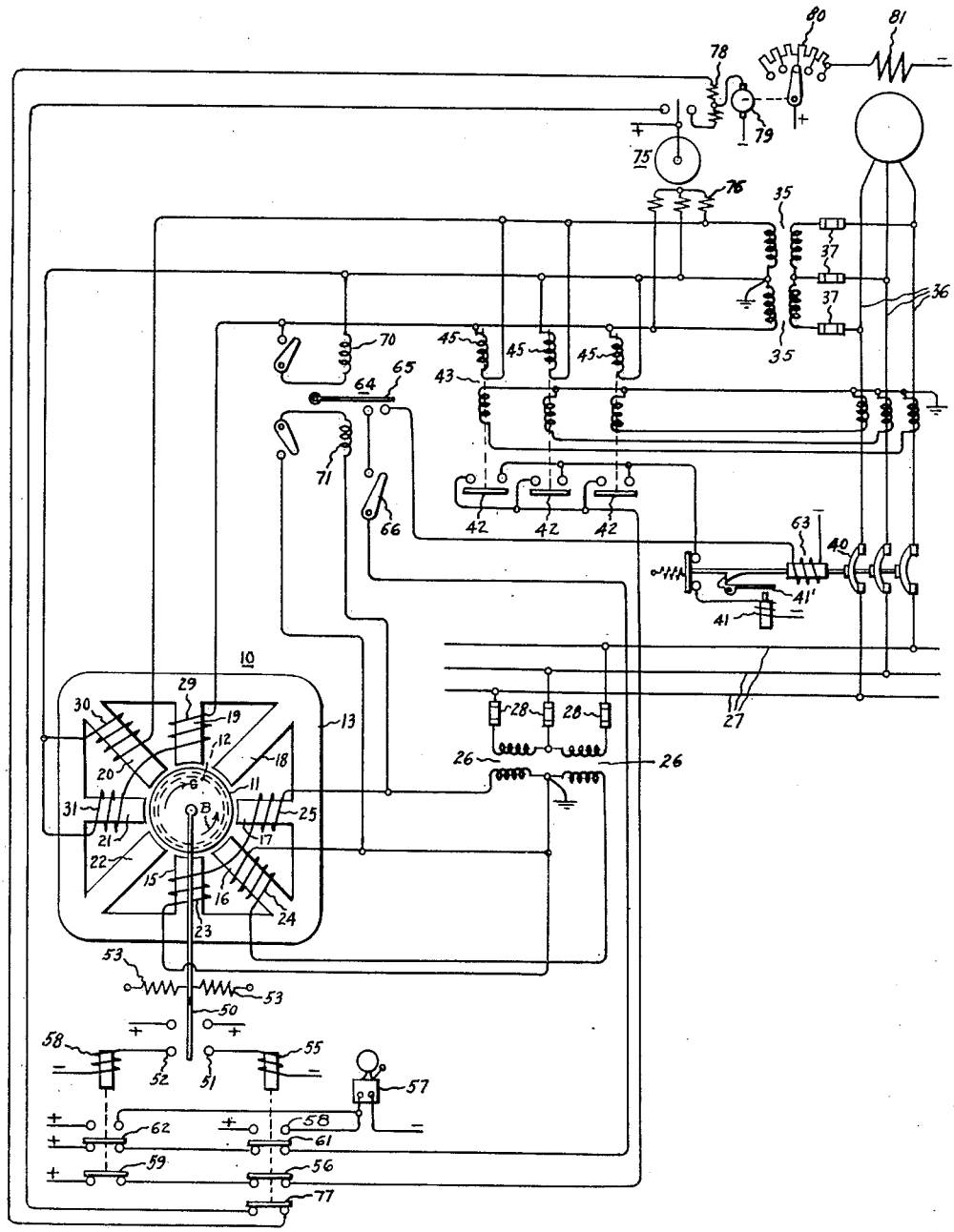
Inventor:
William C. Morris,
by Ernest C. Britton
His Attorney.

UNITED STATES PATENT OFFICE 2,575,925

DUAL POTENTIAL UNBALANCE RESPONSIVE DEVICE

William C. Morris, Sharon Hill, Pa., assignor to General Electric Company, a corporation of New York Application June 9, 1950, Serial No. 167,158

8 Claims. (Cl. 175—294)

The invention relates to potential responsive devices and particularly potential responsive control of protective devices for polyphase electric power systems or networks involving two normally balanced sources of potential and each having separate instrument potential transformers for energizing the various control and protective relays usually associated therewith.

The principal object is to provide an improved dual polyphase potential unbalance responsive device capable of blocking or preventing false operations of the various system or network potential responsive control devices and protective relays upon any unbalance of the dual polyphase potentials as for example in case of accidental failure of one of the instrument potential transformers or blowing of a fuse in any phase circuit thereof or accidental or unintended removal of the fuses or of the potential transformers themselves by so-called roll out or draw-out apparatus or any other loss or abnormal continued reduction of either potential while still enabling the control devices and protective relays to perform their normal and intended control or protective functions in response to a sudden loss or reduction of potential due to ordinary faults on the associated lines or busses of the system or network.

Another object is to provide an improved dual potential unbalance responsive device capable of discriminating between separate and joint loss or substantial reduction of two normally balanced polyphase potentials and therefore capable of supervising the operation of other devices that are separately responsive to either potential so as to prevent or block or otherwise control the response thereof upon the separate reduction or loss of any one or all phase potentials of either one of the dual normally balanced polyphase potentials.

Another object is to provide an improved dual polyphase potential unbalance responsive device having opposite phase sequence polyphase windings each energized from a corresponding polyphase potential for turning an eddy current rotor in a corresponding direction upon any unbalance of the other polyphase potential.

Further objects and advantages of the invention will appear in the following description of the accompanying drawing in which the single figure schematically shows the improved dual potential unbalance responsive device of the present invention interconnected for energization from both the potential transformers associated with a power bus and the potential transformers associated with a polyphase generator supplying power to the bus.

The improved polyphase potential unbalance device indicated generally by the reference character 10 is provided with a cup shaped rotor 11 formed of copper or other eddy current conducting material and pivotally mounted for rotation about a central axis so as to surround the central cylindrical stationary core 12 formed of magnetic material. A stator 13, preferably formed of magnetic laminations is provided with the inwardly projecting symmetrically arranged salient poles 15, 16, 17, 18, 19, 20, 21 and 22 extending adjacent to the periphery of the cup shape rotor 11. The adjacent poles 15, 16 and 17 are provided with the polyphase windings 23, 24 and 25 respectively and these windings are connected to be energized by the step down instrument potential transformer 26 from the polyphase power buses 27, with one of the protective fuses 28 connected in each phase circuit of the primary windings of transformer 26. The oppositely adjacent poles 19, 20 and 21 likewise are provided with the polyphase windings 29, 30 and 31 respectively and these windings are connected to be energized by means of the step down potential transformer 35 from the generator power supply lines 36 with one of the protective fuses 37 connected in each phase circuit of the primary windings of transformer 35 in accordance with the usual custom.

A circuit breaker 40 serves to connect and disconnect the generator power supply lines 36 and the buses 27 and may be of the usual latch type having a trip coil 41 for tripping the latch 41' to open the circuit breaker. The circuit breaker trip coil 41 is shown connected to be energized upon closure of one of the contacts 42 of the generator overcurrent protective relay 43 that is connected with the current transformers 43' to be responsive to the current supplied by the generator to the bus. The overcurrent protective relay 43 is of the improved voltage restraint type, more fully described and claimed in Patents 1,815,749 and 1,946,299 assigned to the assignee of the present invention and has the voltage restraint windings 45 thereof connected to be energized from the secondary of the generator potential transformer 35. In this way the value of the overload current required to trip the circuit breaker 40 is made inversely dependent upon the generator voltage. Consequently with this type of relay a failure of the potential transformer 35 or blowing of one of the primary fuses 37 may result in the protective relay 43 responding to normal overload currents of the generator sufficiently to close one of the contacts 42 and thereby energize the trip coil 41 to open the circuit breaker 40. Thus such potential instrument transformer failure or the blowing of one of the instrument transformer protective fuses may result in false operation of the protective relay 43 to trip circuit breaker 40 even before the current supplied by the generator to the bus becomes excessive or dangerously large. Such false tripping is undesirable and is effectively prevented by means of the present invention.

The improved dual potential unbalance responsive device 10 of the present invention is capable of blocking or effectively preventing the tripping of the circuit breaker 40 due to false operation of the generator overcurrent relay 43 under the conditions noted. In order to accomplish this result, the polyphase windings 25, 23 and 24 are interconnected with the bus potential transformer 26 so as to have an opposite phase sequence from the polyphase windings 29, 30 and 31 that are energized from the generator potential transformer 35. Thus the polyphase windings 23, 24 and 25 produce a moving magnetic field that induces eddy currents in the rotor 11 with a resulting reactive torque in one direction as for example a counterclockwise direction as indicated by the arrow B or while the polyphase windings 29, 30 and 31 induce eddy currents in the rotor 11 with a reactive torque in the opposite direction as indicated by the arrow G.

The rotor 11 carries a switch member 50 that is reversely rotatable between the stationary cooperating contacts 51 and the stationary cooperating contacts 52. Suitable biasing means shown in the form of the springs 53 are provided for biasing the switch member 50 to a position intermediate the contacts 51, 52. Thus when the potential transformers 26 and 35 are in normal operating condition so that the two potentials thereof are substantially balanced, then the torque produced by the polyphase windings 23, 24 and 25 substantially balances the opposite torque produced by the polyphase windings 29, 30 and 31 and consequently the eddy current rotor 11 remains balanced in the intermediate position. If, however, one of the protective fuses 37 should for any reason blow or the connection from the transformer 35 to the polyphase windings 29, 30 and 31 be accidentally broken, then the torque B will predominate over the opposing torque G and as a result switch member 50 will be moved to the position in which contacts 51 are engaged. The closure of the contacts 51 will energize relay of 55, thereby move the relay contact 56 so as to interrupt the energizing circuit of circuit breaker trip coil 41 and in this way prevent tripping of the circuit breaker 40 due to false operation of the potential restrained generator overcurrent protective relay 43. At the same time, contact 58 closes the circuit to energize the alarm bell 57.

In case the bus potential transformer 26 should fail or one of the fuses 28 should blow, then the torque G produced in the eddy current rotor 11 by the polyphase windings 29, 30 and 31 will predominate over the opposing torque B produced by the polyphase winding 23, 24 and 25. As a result switch member 50 will be operated, from its intermediate position to which it is biased, into engagement with the contacts 52, thereby energizing the relay of 58 to move its contact 62 from the position in which it is shown to its position in which the alarm bell 57 is energized. As shown, the normally closed contact 59 of relay 58 may be connected in series with the normally closed contacts 56 of relay 55, in the energizing circuit of the circuit breaker trip coil 41, so as to prevent tripping of the circuit breaker 40 when either of the potential transformers 26 and 35 are not in proper operating condition. However, since the voltage from the secondary of bus potential transformers 26 is not used in connection with protective relay 43, contact 59 of relay 58 may generally be omitted from the energizing circuit of trip coil 41.

It will be understood that various other control devices or protective relays may be connected to be energized from either or both of the potential transformers 26 and 35 if desired. In such case either or both the relays 55 or 58 may be connected so as to prevent false operation as well as sound an alarm whenever either of the potential transformers 26 and 35 are not in normal operating condition. For example, the contact 61 of relay 55 and the contact 62 of relay 58 may be connected in series in the energizing circuit of the closing device 63 for circuit breaker 40 that is normally controlled by the automatic synchronizer indicated generally by reference character 64 and having an automatically operated contact 65 for energizing the circuit breaker closing device 63 in conjunction with the manual switch 66. As shown, the synchronizer 64 has one operating winding 70 connected to be energized from the generator potential transformers 35 and another operating winding 71 connected to be energized from the bus potential transformers 26. Thus upon failure of either the potential transformers 26 and 35 or the protective fuses 28 and 37 associated therewith, false operation of the synchronizer 64 is effectively prevented by the opening of either the contacts 61 or 62 controlled by the improved dual potential unbalance responsive device 10 of the present invention. Likewise, the automatic voltage regulator 75 having the voltage responsive operating windings 76 energized from the generator potential transformers 35 can be protected against false operation in case of failure of the potential transformers 35 or the fuses 37 associated therewith. For this purpose, the contact 77 of relay 55 is connected in the circuit of the raised winding 78 of the operating motor 79 for the field rheostat 80 that controls the excitation current of the generator field winding 81. Consequently, any failure of the generator potential transformers 35 or blowing of any one of the fuses 37 cannot result in a false raising of the generator voltage and the alarm 57 will be sounded to indicate the abnormal condition.

What I claim as new and desire to secure by Letters Patent of the United States is:

1. A dual polyphase potential unbalance responsive device having in combination an induction rotor, and a magnetic stator having opposite phase sequence polyphase windings for producing opposite rotor torques and each provided with connections for energization from a corresponding one of two polyphase potentials having the same phase sequence to balance the opposite rotor torques under balanced polyphase potential conditions and to rotate the rotor in a direction dependent upon any unbalance of the polyphase potentials.

2. A dual polyphase potential unbalance responsive alarm device having in combination a reversibly rotatable induction rotor having control means selectively operated thereby upon rotation in either direction, and a magnetic stator having opposite phase sequence polyphase windings for producing opposite rotor torques and each provided with connections for energization from a corresponding one of two polyphase potentials to balance the opposite rotor torques under balanced polyphase potential conditions and to rotate the rotor to operate the corresponding alarm means upon a corresponding unbalance of the polyphase potentials.

3. A dual polyphase potential transformer unbalance responsive device having in combination an eddy current rotor having a switch member reversely operated thereby between two positions and a magnetic stator having opposite phase sequence polyphase windings for producing opposite rotor torques and each provided with connections for energization from a secondary of a corresponding one of the polyphase potential transformers to balance the opposite rotor torques under balanced transformer secondary potential conditions and to rotate the rotor in a direction to operate the switch member to a corresponding position upon a corresponding unbalance of the secondary potentials of either transformer.

4. A dual polyphase potential unbalance responsive device having in combination an induction rotor, a switch member operated by the rotor between two circuit closing positions, means biasing the switch member to an intermediate position, and a magnetic stator having opposite phase sequence polyphase windings for producing opposite rotor torques and each provided with separate connections for energization from a corresponding one of the dual polyphase potentials to balance the opposite rotor torques under balanced polyphase potential conditions and to reversely rotate the rotor and thereby effect operation of the switch member from the intermediate position to a corresponding one of the circuit closing positions upon a corresponding unbalance of the polyphase potentials.

5. A dual polyphase potential unbalance responsive device having in combination an eddy current rotor, a switch member operated by the rotor between two circuit closing positions, means biasing the switch member to an intermediate position, and a hollow magnetic stator having a plurality of inwardly projecting poles in inductive relation with the rotor and provided with opposite phase sequence polyphase windings for producing opposite rotor torques and each provided with separated connections for energization from a corresponding one of the dual polyphase potentials to balance the opposite rotor torques under balance polyphase potential conditions and to reversely rotate the rotor and thereby effect operation of the switch member from the intermediate position to a corresponding one of the circuit closing positions upon a corresponding unbalance of the polyphase potentials.

6. In combination, a dual potential unbalance responsive device having a movable control member operable upon unbalance of the dual potentials and a separately operable potential responsive control device normally responsive to one of the dual potentials and having means under control of the movable control member for rendering the separately operable control device ineffective upon unbalance of the dual potentials.

7. In combination a dual polyphase potential unbalance responsive device having two polyphase potential supply sources and a movable control member selectively operable by the responsive device upon any phase failure of either source and an independent potential responsive control device normally responsive to the potential of one of the sources and having means under control of the control member for rendering the independent control device ineffective upon a predetermined selective operation of the control member.

8. In combination a dual polyphase potential unbalance responsive device having two polyphase potential supply transformers and a control member operable upon any unbalance of either transformer and an independent potential responsive control device normally responsive to the potential of one of the transformers and having means under control of the control member for rendering the control device ineffective upon any unbalance of the one transformer.

WILLIAM C. MORRIS.

REFERENCES CITED

The following references are of record in the file of this patent:

UNITED STATES PATENTS

| Number | Name | Date |
| --- | --- | --- |
| Re. 21,813 | Verrall | May 27, 1941 |
| 1,347,772 | Basch | July 27, 1920 |
| 1,705,687 | Sleeper | Mar. 19, 1929 |
| 1,736,435 | Fortescue | Nov. 19, 1929 |
| 1,748,763 | Gilson | Feb. 25, 1930 |